[19] United States Patent
Li et al.

(10) Patent No.: US 9,852,140 B1
(45) Date of Patent: Dec. 26, 2017

(54) EFFICIENT FILE REPLICATION (71) Applicant: Axcient, Inc., Mountain View, CA (US)

(72) Inventors: Kong Li, Los Altos, CA (US); Robert Petri, Santa Clara, CA (US); Nitin Parab, Palo Alto, CA (US)

(73) Assignee: AXCIENT, INC., Mountain View, CA (US)

( * ) Notice: Subject to any disclaimer, the term of this patent is extended or adjusted under 35 U.S.C. 154(b) by 0 days.

(21) Appl. No.: 13/671,498

(22) Filed: Nov. 7, 2012

(51) Int. Cl.
*G06F 17/00* (2006.01)
*G06F 17/30* (2006.01)
(52) U.S. Cl.
CPC .............. *G06F 17/30091* (2013.01)
(58) Field of Classification Search
CPC ............ G06F 17/30191; G06F 3/0656; H04L 49/9005; H04L 49/9047; H04L 49/9052
USPC .......................................... 707/639
See application file for complete search history.

(56) References Cited

U.S. PATENT DOCUMENTS

| | | | |
|---|---|---|---|
| 5,379,412 | A | 1/1995 | Eastridge et al. |
| 5,574,905 | A | 11/1996 | deCarmo |
| 5,860,107 | A | 1/1999 | Patel |
| 6,122,629 | A | 9/2000 | Walker et al. |
| 6,205,527 | B1 | 3/2001 | Goshey et al. |
| 6,233,589 | B1 | 5/2001 | Balcha et al. |
| 6,272,492 | B1 | 8/2001 | Kay |
| 6,411,985 | B1 * | 6/2002 | Fujita et al. .................. 709/201 |
| 6,604,236 | B1 | 8/2003 | Draper et al. |
| 6,629,110 | B2 | 9/2003 | Cane et al. |
| 6,651,075 | B1 | 11/2003 | Kusters et al. |
| 6,971,018 | B1 | 11/2005 | Witt et al. |
| 7,024,581 | B1 | 4/2006 | Wang et al. |
| 7,085,904 | B2 | 8/2006 | Mizuno et al. |
| 7,266,655 | B1 | 9/2007 | Escabi, II et al. |
| 7,401,192 | B2 | 7/2008 | Stakutis et al. |
| 7,406,488 | B2 | 7/2008 | Stager et al. |
| 7,546,323 | B1 | 6/2009 | Timmins et al. |
| 7,620,765 | B1 | 11/2009 | Ohr et al. |
| 7,631,155 | B1 | 12/2009 | Bono et al. |
| 7,647,338 | B2 | 1/2010 | Lazier et al. |
| 7,676,763 | B2 | 3/2010 | Rummel |
| 7,730,425 | B2 | 6/2010 | de los Reyes et al. |
| 7,743,038 | B1 | 6/2010 | Goldick |
| 7,752,487 | B1 | 7/2010 | Feeser et al. |
| 7,769,731 | B2 | 8/2010 | O'Brien |
| 7,797,582 | B1 | 9/2010 | Stager et al. |
| 7,809,688 | B2 | 10/2010 | Cisler et al. |
| 7,832,008 | B1 | 11/2010 | Kraemer |
| 7,844,850 | B2 | 11/2010 | Yasuzato |

(Continued)

OTHER PUBLICATIONS

Caputo, "Systems and Methods for Restoring a File", U.S. Appl. No. 12/895,275, filed Sep. 30, 2010.

(Continued)

*Primary Examiner* — Hung T Vy (57) ABSTRACT

Systems, methods, and media for efficient file replication are provided herein. According to some embodiments, exemplary methods may include detecting a write operation occurring within an operating system of the computing system, identifying block parameters for the write operation, as well as one or more of buffering and batching the write operation, and transmitting the write operation to a replication receiver system.

25 Claims, 4 Drawing Sheets

(56) References Cited

U.S. PATENT DOCUMENTS

| | | |
|---|---|---|
| 7,873,601 B1 | 1/2011 | Kushwah |
| 7,930,275 B2 | 4/2011 | Chen et al. |
| 7,966,293 B1 | 6/2011 | Owara et al. |
| 8,037,345 B1 | 10/2011 | Iyer et al. |
| 8,046,632 B2 | 10/2011 | Miwa et al. |
| 8,060,476 B1* | 11/2011 | Afonso et al. ............... 707/649 |
| 8,099,391 B1 | 1/2012 | Monckton |
| 8,099,572 B1 | 1/2012 | Arora et al. |
| 8,117,163 B2 | 2/2012 | Brown et al. |
| 8,200,926 B1 | 6/2012 | Stringham |
| 8,224,935 B1 | 7/2012 | Bandopadhyay et al. |
| 8,244,678 B1 | 8/2012 | Hartland et al. |
| 8,244,914 B1 | 8/2012 | Nagarkar |
| 8,245,156 B2 | 8/2012 | Mouilleseaux et al. |
| 8,260,742 B2 | 9/2012 | Cognigni et al. |
| 8,279,174 B2 | 10/2012 | Jee et al. |
| 8,296,410 B1 | 10/2012 | Myhill et al. |
| 8,321,688 B2 | 11/2012 | Auradkar et al. |
| 8,332,442 B1 | 12/2012 | Greene |
| 8,352,717 B2 | 1/2013 | Campbell et al. |
| 8,381,133 B2 | 2/2013 | Iwema et al. |
| 8,402,087 B2 | 3/2013 | O'Shea et al. |
| 8,407,190 B2 | 3/2013 | Prahlad et al. |
| 8,412,680 B1 | 4/2013 | Gokhale et al. |
| 8,417,674 B2 | 4/2013 | Provenzano |
| 8,504,785 B1 | 8/2013 | Clifford et al. |
| 8,533,608 B1 | 9/2013 | Tantiprasut |
| 8,549,432 B2 | 10/2013 | Warner |
| 8,554,918 B1 | 10/2013 | Douglis |
| 8,572,337 B1 | 10/2013 | Gokhale et al. |
| 8,589,350 B1 | 11/2013 | Lalonde et al. |
| 8,589,913 B2 | 11/2013 | Jelvis et al. |
| 8,600,947 B1 | 12/2013 | Freiheit et al. |
| 8,601,389 B2 | 12/2013 | Schulz et al. |
| 8,606,752 B1 | 12/2013 | Beatty et al. |
| 8,639,917 B1 | 1/2014 | Ben-Shaul et al. |
| 8,676,273 B1 | 3/2014 | Fujisaki |
| 8,745,003 B1 | 6/2014 | Patterson |
| 8,767,593 B1 | 7/2014 | Allen et al. |
| 8,886,611 B2 | 11/2014 | Caputo |
| 8,924,360 B1 | 12/2014 | Caputo |
| 8,954,544 B2 | 2/2015 | Edwards |
| 9,104,621 B1 | 8/2015 | Caputo |
| 9,110,964 B1 | 8/2015 | Shilane et al. |
| 9,213,607 B2 | 12/2015 | Lalonde et al. |
| 9,235,474 B1 | 1/2016 | Petri et al. |
| 9,292,153 B1 | 3/2016 | Edwards et al. |
| 9,397,907 B1 | 7/2016 | Edwards et al. |
| 9,559,903 B2 | 1/2017 | Edwards |
| 9,705,730 B1 | 7/2017 | Petri et al. |
| 2001/0034737 A1 | 10/2001 | Cane et al. |
| 2001/0056503 A1 | 12/2001 | Hibbard |
| 2002/0124124 A1 | 9/2002 | Matsumoto et al. |
| 2002/0169740 A1 | 11/2002 | Korn |
| 2003/0011638 A1 | 1/2003 | Chung |
| 2003/0158873 A1 | 8/2003 | Sawdon et al. |
| 2003/0177293 A1 | 9/2003 | Bilak et al. |
| 2003/0208492 A1 | 11/2003 | Winiger et al. |
| 2003/0221083 A1* | 11/2003 | Hill ................ G06F 11/1435 711/207 |
| 2004/0030852 A1 | 2/2004 | Coombs et al. |
| 2004/0044707 A1 | 3/2004 | Richard |
| 2004/0073560 A1 | 4/2004 | Edwards |
| 2004/0073677 A1 | 4/2004 | Honma et al. |
| 2004/0093474 A1 | 5/2004 | Lin et al. |
| 2004/0098423 A1 | 5/2004 | Chigusa et al. |
| 2004/0233924 A1* | 11/2004 | Bilak et al. ............... 370/412 |
| 2004/0260973 A1 | 12/2004 | Michelman |
| 2005/0010835 A1 | 1/2005 | Childs et al. |
| 2005/0027748 A1 | 2/2005 | Kisley |
| 2005/0114290 A1* | 5/2005 | Borthakur ................ G06F 7/02 |
| 2005/0154937 A1 | 7/2005 | Achiwa |
| 2005/0171979 A1 | 8/2005 | Stager et al. |
| 2005/0223043 A1 | 10/2005 | Randal et al. |
| 2005/0273654 A1 | 12/2005 | Chen et al. |
| 2005/0278583 A1 | 12/2005 | Lennert et al. |
| 2005/0278647 A1 | 12/2005 | Leavitt et al. |
| 2006/0013462 A1 | 1/2006 | Sadikali |
| 2006/0047720 A1 | 3/2006 | Kulkarni et al. |
| 2006/0064416 A1 | 3/2006 | Sim-Tang |
| 2006/0224636 A1 | 10/2006 | Kathuria et al. |
| 2007/0033301 A1 | 2/2007 | Aloni et al. |
| 2007/0038884 A1 | 2/2007 | Campbell et al. |
| 2007/0061385 A1 | 3/2007 | Clark et al. |
| 2007/0112895 A1 | 5/2007 | Ahrens et al. |
| 2007/0113032 A1 | 5/2007 | Kameyama et al. |
| 2007/0143497 A1 | 6/2007 | Kottomtharayil et al. |
| 2007/0168413 A1 | 7/2007 | Barletta et al. |
| 2007/0176898 A1 | 8/2007 | Suh |
| 2007/0179995 A1 | 8/2007 | Prahlad et al. |
| 2007/0180207 A1 | 8/2007 | Garfinkle |
| 2007/0198789 A1 | 8/2007 | Clark et al. |
| 2007/0204166 A1 | 8/2007 | Tome et al. |
| 2007/0208918 A1 | 9/2007 | Harbin et al. |
| 2007/0220029 A1 | 9/2007 | Jones et al. |
| 2007/0226400 A1 | 9/2007 | Tsukazaki |
| 2007/0233699 A1 | 10/2007 | Taniguchi et al. |
| 2007/0250302 A1 | 10/2007 | Xu et al. |
| 2007/0260842 A1 | 11/2007 | Faibish et al. |
| 2007/0276916 A1 | 11/2007 | McLoughlin et al. |
| 2007/0283017 A1 | 12/2007 | Anand et al. |
| 2007/0283343 A1 | 12/2007 | Aridor et al. |
| 2007/0288525 A1 | 12/2007 | Stakutis et al. |
| 2007/0288533 A1 | 12/2007 | Srivastava et al. |
| 2007/0294321 A1 | 12/2007 | Midgley et al. |
| 2008/0005468 A1 | 1/2008 | Faibish et al. |
| 2008/0010422 A1 | 1/2008 | Suzuki et al. |
| 2008/0027998 A1 | 1/2008 | Hara |
| 2008/0036743 A1 | 2/2008 | Westerman et al. |
| 2008/0082310 A1 | 4/2008 | Sandorfi et al. |
| 2008/0133622 A1 | 6/2008 | Brown et al. |
| 2008/0141018 A1 | 6/2008 | Tanaka et al. |
| 2008/0154979 A1 | 6/2008 | Saitoh et al. |
| 2008/0162590 A1 | 7/2008 | Kundu et al. |
| 2008/0162607 A1 | 7/2008 | Torii et al. |
| 2008/0201315 A1 | 8/2008 | Lazier et al. |
| 2008/0229050 A1* | 9/2008 | Tillgren .................. 711/200 |
| 2008/0307345 A1 | 12/2008 | Hart et al. |
| 2008/0307527 A1 | 12/2008 | Kaczmarski et al. |
| 2009/0089253 A1 | 4/2009 | Huang et al. |
| 2009/0094427 A1 | 4/2009 | Sano |
| 2009/0164527 A1 | 6/2009 | Spektor et al. |
| 2009/0185500 A1 | 7/2009 | Mower et al. |
| 2009/0216973 A1 | 8/2009 | Nakajima et al. |
| 2009/0248755 A1 | 10/2009 | Watanabe et al. |
| 2009/0276771 A1 | 11/2009 | Nickolov et al. |
| 2009/0309849 A1 | 12/2009 | Iwema et al. |
| 2009/0319653 A1 | 12/2009 | Lorenz et al. |
| 2009/0327964 A1 | 12/2009 | Mouilleseaux et al. |
| 2010/0042449 A1 | 2/2010 | Thomas |
| 2010/0077165 A1 | 3/2010 | Lu et al. |
| 2010/0095077 A1 | 4/2010 | Lockwood |
| 2010/0104105 A1 | 4/2010 | Schmidt et al. |
| 2010/0107155 A1 | 4/2010 | Banerjee et al. |
| 2010/0114832 A1 | 5/2010 | Lillibridge et al. |
| 2010/0165947 A1 | 7/2010 | Taniuchi et al. |
| 2010/0179941 A1 | 7/2010 | Agrawal et al. |
| 2010/0179973 A1* | 7/2010 | Carruzzo ................. 707/827 |
| 2010/0192103 A1 | 7/2010 | Cragun et al. |
| 2010/0205152 A1 | 8/2010 | Ansari et al. |
| 2010/0223368 A1 | 9/2010 | Runcie et al. |
| 2010/0228999 A1 | 9/2010 | Maheshwari et al. |
| 2010/0235831 A1 | 9/2010 | Dittmer |
| 2010/0262637 A1 | 10/2010 | Akagawa et al. |
| 2010/0268689 A1 | 10/2010 | Gates et al. |
| 2010/0318748 A1 | 12/2010 | Ko et al. |
| 2010/0325377 A1 | 12/2010 | Lango et al. |
| 2010/0332454 A1 | 12/2010 | Prahlad et al. |
| 2011/0041004 A1 | 2/2011 | Miwa et al. |
| 2011/0047405 A1 | 2/2011 | Marowsky-Bree et al. |
| 2011/0055399 A1 | 3/2011 | Tung et al. |
| 2011/0055471 A1 | 3/2011 | Thatcher et al. |
| 2011/0055500 A1 | 3/2011 | Sasson et al. |
| 2011/0082998 A1 | 4/2011 | Boldy et al. |

(56) References Cited

U.S. PATENT DOCUMENTS

| | | |
|---|---|---|
| 2011/0106768 A1 | 5/2011 | Khanzode et al. |
| 2011/0154268 A1 | 6/2011 | Trent, Jr. et al. |
| 2011/0218966 A1 | 9/2011 | Barnes et al. |
| 2011/0238937 A1 | 9/2011 | Murotani et al. |
| 2011/0264785 A1 | 10/2011 | Newman et al. |
| 2011/0265143 A1 | 10/2011 | Grube et al. |
| 2011/0295811 A1 | 12/2011 | Cherkasova et al. |
| 2011/0302502 A1 | 12/2011 | Hart et al. |
| 2011/0307681 A1 | 12/2011 | Piry et al. |
| 2012/0013540 A1 | 1/2012 | Hogan |
| 2012/0065802 A1 | 3/2012 | Seeber et al. |
| 2012/0084501 A1 | 4/2012 | Watanabe et al. |
| 2012/0124307 A1 | 5/2012 | Ashutosh et al. |
| 2012/0130956 A1 | 5/2012 | Caputo |
| 2012/0131235 A1 | 5/2012 | Nageshappa et al. |
| 2012/0179655 A1 | 7/2012 | Beatty et al. |
| 2012/0204060 A1 | 8/2012 | Swift et al. |
| 2012/0210398 A1 | 8/2012 | Triantafillos et al. |
| 2012/0215743 A1 | 8/2012 | Triantafillos et al. |
| 2013/0018946 A1 | 1/2013 | Brown et al. |
| 2013/0024426 A1 | 1/2013 | Flowers et al. |
| 2013/0036095 A1 | 2/2013 | Titchener et al. |
| 2013/0091183 A1 | 4/2013 | Edwards et al. |
| 2013/0091471 A1 | 4/2013 | Gutt et al. |
| 2013/0125097 A1 | 5/2013 | Ebcioglu et al. |
| 2013/0166511 A1 | 6/2013 | Ghatty et al. |
| 2013/0234402 A1 | 9/2013 | Fietz |
| 2013/0238562 A1 | 9/2013 | Kumarasamy et al. |
| 2013/0238752 A1 | 9/2013 | Park et al. |
| 2013/0318046 A1 | 11/2013 | Clifford et al. |
| 2014/0006858 A1 | 1/2014 | Helfman et al. |
| 2014/0032498 A1 | 1/2014 | Lalonde et al. |
| 2014/0040580 A1 | 2/2014 | Kripalani |
| 2014/0047081 A1 | 2/2014 | Edwards |
| 2014/0052694 A1 | 2/2014 | Dasari et al. |
| 2014/0053022 A1 | 2/2014 | Forgette et al. |
| 2014/0089619 A1 | 3/2014 | Khanna et al. |
| 2014/0101113 A1 | 4/2014 | Zhang et al. |
| 2014/0149358 A1 | 5/2014 | Aphale et al. |
| 2014/0189680 A1 | 7/2014 | Kripalani |
| 2014/0201137 A1 | 7/2014 | Vibhor et al. |
| 2014/0201144 A1 | 7/2014 | Vibhor et al. |
| 2014/0244599 A1 | 8/2014 | Zhang et al. |
| 2014/0303961 A1 | 10/2014 | Leydon et al. |
| 2015/0046404 A1 | 2/2015 | Caputo |
| 2015/0095691 A1 | 4/2015 | Edwards |
| 2016/0054911 A1 | 2/2016 | Edwards et al. |
| 2016/0055062 A1 | 2/2016 | Petri et al. |
| 2016/0105312 A1 | 4/2016 | Edwards |
| 2016/0110261 A1 | 4/2016 | Parab et al. |
| 2016/0162349 A1 | 6/2016 | Edwards et al. |
| 2016/0182170 A1 | 6/2016 | Daoura et al. |
| 2017/0075719 A1 | 3/2017 | Scallan et al. |
| 2017/0090786 A1 | 3/2017 | Parab et al. |
| 2017/0177452 A1 | 6/2017 | Parab et al. |

OTHER PUBLICATIONS

Petri, Robert et al., "Cloud Storage Using Merkle Trees," U.S. Appl. No. 13/889,164, filed May 7, 2013, 33 pages.

\* cited by examiner

EFFICIENT FILE REPLICATION

FIELD OF THE INVENTION

The present technology may be generally described as providing systems and methods that efficiently detect and replicate changes in files from a sender system to a receiver system. More specifically, but not by way of limitation, the present technology may allow for near-continuous replication of changes to files. The present technology may allow for detection of write operations using a filter driver. A write operation may be evaluated to determine changes in a file caused by the write operation. These changes may be passed directly to a replication receiver system for file replication, or may be batched and/or buffered before transmission to the replication receiver system.

BACKGROUND

Physical devices such as hard drives are often backed up to remote storage systems, which may also comprise cloud-based storage media. Common methods for backing up physical devices over time include the capturing of mirrors (e.g., snapshots) as well as incremental files that represent changes to files of a physical device that occur between mirror captures. These methods require periodic examination of the file system of the physical device to determine changes in files from previous mirrors and/or incremental files.

SUMMARY OF THE PRESENT TECHNOLOGY

According to some embodiments, the present technology may be directed to methods that comprise: (a) detecting a write operation on a computing system, the write operation comprising block parameters that define changes to a file; and (b) transmitting the block parameters to a replication receiver system.

According to various embodiments, the present technology may be directed to methods that comprise: (a) detecting a write operation occurring within an operating system of the computing system; (b) identifying block parameters for the write operation; (c) one or more of buffering and batching the write operation; and (d) transmitting the write operation to a replication receiver system.

According to exemplary embodiments, the present technology may be directed to systems that may comprise: (a) at least one server having a memory that includes executable instructions and a processor executing the instructions, the instructions comprising: (i) a filter driver controller communicatively couplable with a filter driver executing on an end user computing system, the filter driver controller executes the filter driver to: (1) detect a write operation on a computing system, the write operation comprising block parameters that define changes to a file; and (2) transmit the block parameters to a replication receiver system.

According to other embodiments, the present technology may be directed to a non-transitory machine-readable storage medium having embodied thereon a program. In some embodiments the program may be executed by a machine to perform a method for replicating file changes. The method may comprise: (a) detecting a write operation on a computing system, the write operation comprising block parameters that define changes to a file; and (b) transmitting the block parameters to a replication receiver system.

According to various embodiments, the present technology may be directed to methods that comprise: (a) detecting a write operation on a computing system, the write operation comprising block parameters that define changes to a file; (b) recording the block parameters; (c) transmitting a request to the computing system to obtain a file system snapshot; (d) obtaining changed data from the requested file system snapshot using the block parameters; and (e) transmitting the changed data to a replication receiver system.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DESCRIPTION OF EXEMPLARY EMBODIMENTS

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

The need to periodically examine a file system of the physical device to determine changes in a file is typically an inefficient process. More efficient methods and systems for detecting and replicating changes in files onto a replication receiver system are therefore advantageous.

Generally speaking, the present technology is directed to systems and methods that efficiently replicate changes in files onto replication receiver systems. More specifically, but not by limitation, the present technology allows for detection and transmission of changes to files for near-continuous file replication. In some embodiments, the present technology may employ a filter driver that is installed on a computing system. The filter driver may detect write operations occurring on the computing system. When a write operation is detected, the present technology may determine the block parameters for the write operation, which may comprise an offset, a size (e.g., length etc.), and changes to bytes within blocks. These changed blocks may be located within a file using the offset and length.

Once these block parameters have been deduced, the block parameters may be transmitted to a replication receiver system. The replication receiver system may comprise a mirror or snapshot of the computing system, along with incremental files. The replication receiver system may replicate the changes onto another replication receiver system by modifying a mirror or an incremental file. In other instances, the changes to the file represented by the block parameters may be stored individually until they are needed, such as during the execution of a backup of the computing system during a failover or other recovery event.

The present technology may transmit write operations and their constituent block parameters as soon as they are detected (e.g., synchronous). In other instances, the present technology may buffer and/or batch write operations in a buffer on the computing system (e.g., asynchronous). The present technology may store either a predetermined number of block parameters in the buffer before transmission or may store write operations that occur during a given period of time. In some instances the present technology may utilize both buffer size and interval constraints for buffer storage of write operations. It will be understood that the use of batching and buffering of block parameters (e.g., file changes) may reduce network congestion and latency caused by near-real-time transmission of file changes.

In other embodiments, the present technology may record write operations and at least a portion of their block parameters without storing the actual changed data associated with the write operations. For example, the block parameters may in some instances comprise offsets, lengths, and sizes for write operations. The actual changed data may be obtained from file system snapshots, including combined file system snapshots, as will be discussed in greater detail below.

Additionally, the present technology may utilize an intelligent filter driver that dynamically adjusts its operational parameters to ensure that the computing system of the end user is not deleteriously affected by the buffering and batching of write operations. These and other advantages of the present technology will be discussed in greater detail herein.

Figure 1:
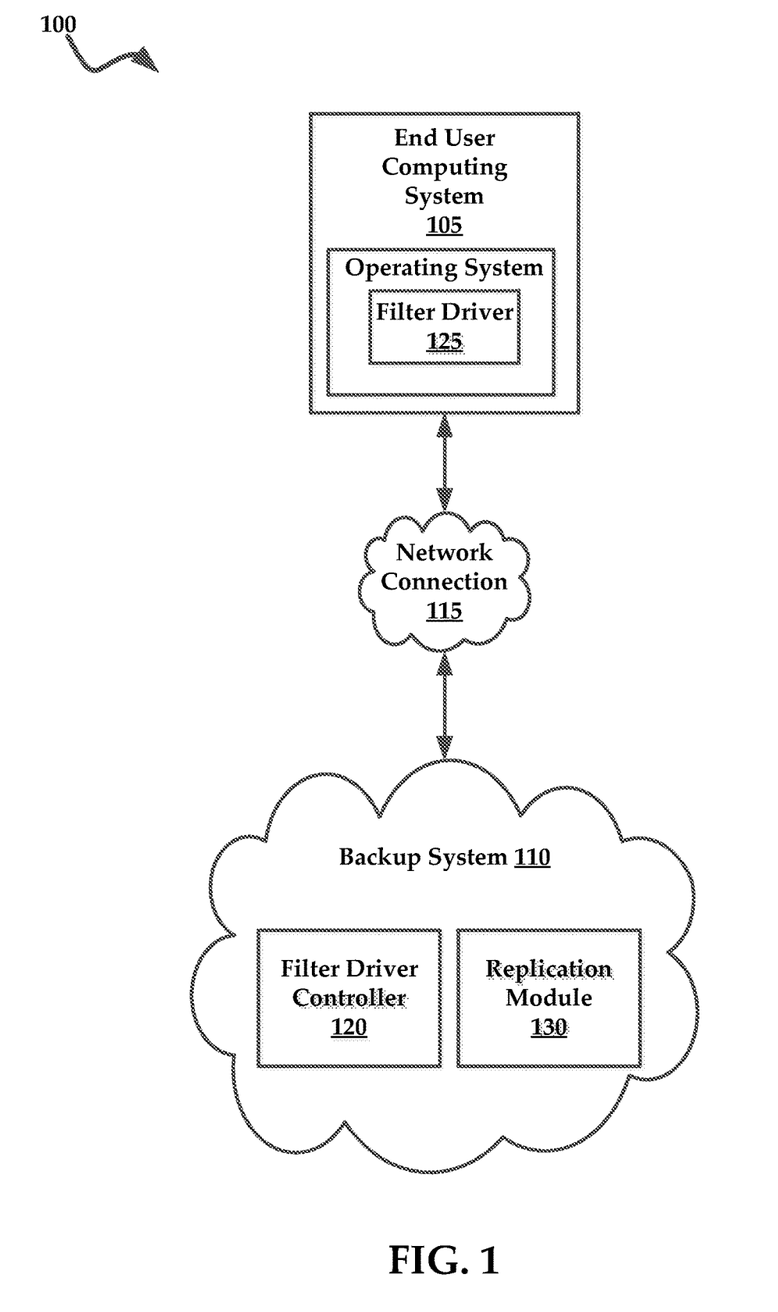
FIG. 1 is a block diagram of an exemplary architecture in which embodiments according to the present technology may be practiced.

Referring now to FIG. 1, there is depicted a schematic diagram of an exemplary architecture 100 for practicing the present technology. Architecture 100 may include a plurality of computing systems that may include an end user computing system 105. It will be understood that any of the end user computing system 105 may be operatively connected to a replication receiver system 110, which may comprise a local or remote replication receiver system. The end user computing system 105 and the replication receiver system 110 may be communicatively coupled with each another via a network connection 115, such as the Internet etc.

According to some embodiments, the end user computing system 105 and the replication receiver system 110 may reside on the same machine. Thus, in some instances, the network connection 115 may not be required to communicatively couple the end user computing system 105 and the replication receiver system 110.

In some instances, the replication receiver system 110 may communicatively couple with a plurality of end user computing systems.

Generally speaking, the replication receiver system 110 provides file replication services for files that reside on the end user computing system 105. In some instances, the end user computing system 105 may connect to multiple replication receiver systems. In some instances, the replication receiver system 110 may connect to multiple end user computing systems. In some instances, the replication receiver system 110 may be implemented within a cloud-based computing environment. In general, a cloud-based computing environment is a resource that typically combines the computational power of a large model of processors and/or that combines the storage capacity of a large model of computer memories or storage devices. For example, systems that provide a cloud resource may be utilized exclusively by their owners, such as Google™ or Yahoo!™; or such systems may be accessible to outside users who deploy applications within the computing infrastructure to obtain the benefit of large computational or storage resources.

The cloud may be formed, for example, by a network of web servers, with each web server (or at least a plurality thereof) providing processor and/or storage resources. These servers may manage workloads provided by multiple users (e.g., cloud resource consumers or other users). Typically, each user places workload demands upon the cloud that vary in real time, sometimes dramatically. The nature and extent of these variations typically depend on the type of business associated with the user.

In greater detail, the replication receiver system 110 may include one or more VPN devices adapted to receive information from the gateway router of the end user computing system 105. In some embodiments, the network connection 115 may include an Ethernet switch operatively coupling the VPN devices to a remote replication receiver system 110 adapted to execute at least a portion of methods for replicating files. The replication receiver system 110 may also include disaster recovery servers, physical media input servers, and one or more virus scanning servers.

It will be understood that the primary storage devices for the replication receiver system 110 may include, for example, RAID 5 redundant storage servers, although other types of servers that would be known to one of ordinary skill in the art with the present disclosure before them are likewise contemplated for use in accordance with the present technology.

In some embodiments, the replication receiver system 110 may comprise a filter driver controller 120 and a replication module 130, which are stored in memory and executable by a processor of the replication receiver system 110. It is noteworthy that the replication receiver system 110 may include additional or fewer modules, engines, or components, and still fall within the scope of the present technology. As used herein, the term "module" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality. In other embodiments, individual modules of the replication receiver system 110 may include separately configured web servers.

In accordance with the present disclosure, the filter driver controller 120 may cooperate with a filter driver 125, which may be installed on an end user computing system 105. According to some embodiments, the filter driver 125 may be installed within a layer of the operating system of the end user computing system 105. The filter driver 125 may be placed within any layer of the operating system that allows the filter driver 125 to detect write operations occurring in the operating system.

The filter driver controller 120 may execute the filter driver 125 to detect write operations occurring in the operating system. Write operations may comprise changes in blocks of files stored on a physical media, such as a hard drive, of the end user computing system 105.

When a write operation is detected, the filter driver 125 may evaluate the write operation for block parameters. The term "detect" may comprise intercept, notice, identify, distinguish, discover, and so forth. It will be understood that the block parameters of a write operation may comprise descriptive details about the write operation. For example, the block parameters of a write operation may occur as changes to specific blocks within a file. The offset and size (e.g., length) included in the block parameters represents a location within the file where a change in a block data has occurred. Thus, in addition to the offset and length, a block parameter may comprise block data. The block data will be understood as comprising the actual changed bytes of data for a write operation in some embodiments.

It is noteworthy that a single write operation may comprise a plurality block parameters that represent a plurality of changes to a file. Thus, the block parameters may comprise a plurality of offsets, lengths, and block data which may correspond to a single write operation.

Generally, exemplary methods may allow for complete storage or write operations in a buffer (e.g., not only offsets, lengths, and size, but also the actual changed data that corresponds to these parameters). Alternatively, other exemplary methods allow for recording of block parameters such as offsets, lengths, and size. Instead of buffering the actual changed data that corresponds to these parameters, the filter driver controller 120 may request that the end user computing system 105 obtain a snapshot of its file system. Actual changed data may be obtained from the file system snapshot using the recorded offsets, lengths, and sizes to locate changed data blocks.

Before transmitting the write operation to a replication receiver system 110, the filter driver 125 may combine multiple write operations together. Combining of write operations may include coalescing, merging, and/or removing redundancy across multiple write operations. Advantageously, these features may reduce the amount and/or size of data transferred across the network, reducing communication overhead and network latency.

By way of non-limiting example, two write operations {offset 100, size 100} and {offset 100, size 100} against the same file can be reduced to a single write {offset 100, size 100}. Thus, the last write operation "wins." Additional write operations {offset 100, size 200} and {offset 300, size 400} against the same file can be merged into a single write {offset 100, size 600} for the file. In some instances, two overlapping write operations {offset 100, size 200} and {offset 200, size 300} against the same file can be combined to a single write {offset 100, size 400}.

Let "changed set" be a set of block parameters corresponding to write operations without actual changed bytes of data. Therefore the changed set between two file system snapshots represent the incremental updates which can be applied to the first file system snapshot to generate the second file system snapshot. Assume that SS(t) represents file system snapshot at time t, and CS(t1, t2) represents changed set between SS(t1) and SS(t2). Using a time line which extends from left to right: SS(t1)-CS(t1, t2)-SS(t2)-CS(t2, t3)-SS(t3), one can retrieve actual changed bytes of data for CS(t1, t2) from SS(t2).

Multiple change sets can be coalesced to simulate the effect of just two file system snapshots without any intermediate file system snapshots. Using a time line which extends from left to right: SS(t1)-CS(t1, t2)-SS(t2)-CS(t2, t3)-SS(t3), after coalescing CS(t1, t2) and CS(t2, t3), the actual changed bytes of data may be read from SS(t3) based on the combined change sets, without involving SS(t2).

The ability to maintain multiple file system snapshots and multiple changed sets allows for an end user computing system 105 to have concurrent replication on multiple replication receiver systems.

Once the write operation has been understood in terms of its block parameters, the filter driver controller 120 may cause the filter driver 125 to perform any one of a plurality of steps for transmitting the block parameters to the replication receiver system 110. In some instances, the filter driver 125 may send the block parameters to the replication receiver system 110 in a near-real-time or synchronous manner. While transmitting write operations in a synchronous manner may allow the replication receiver system 110 to provide near-continuous file replication, network congestion may occur because of the frequency of transmissions required. That is, files may be changed frequently on a computing system, and therefore many write operations may be occurring within a relatively short period of time. Additionally, if the replication receiver system 110 is servicing many end user computing systems, data transmission to the replication receiver system 110 may increase network latency.

Therefore, the filter driver controller 120 may execute one or more of buffer and batch write operations before transmitting the same to the replication receiver system 110. This buffering and/or batching of write operations provides for asynchronous data transmission of write operations to the replication receiver system 110.

More specifically, the filter driver controller 120 may cause the filter driver 125 to establish a buffer from free memory available on the end user computing system 105. The filter driver 125 may establish a buffer with a default size, which may depend on the free memory available. Thus, when free memory is low, the size of the buffer may be relatively small. Additionally, the size of the buffer may be dynamically adjusted according to the workload of the end user computing system 105. Greater details regarding the use of an intelligent or adaptive filter driver (or filter driver controller) that dynamically adjusts the buffer size will be described in greater detail below.

In some instances, the filter driver controller 120 may establish a predetermined amount of write operations that are to be batched in the buffer. These batched write operations may be transmitted to the replication receiver system 110. The number of write operations may be established in terms of an aggregate number of write operations. In other embodiments, the number of write operations may be established in terms of a total byte size of write operations. The filter driver controller 120 may transmit write operations when the buffer is substantially full of write operations. In some instances, the filter driver controller 120 may cause the filter driver 125 to transmit write operations when the buffer is substantially full of write operations.

In some instances, the buffer may receive relatively fewer write operations if the write operations are relatively large in size. Once the threshold number of write operations has been batched, the batched write operations are then transmitted to the replication receiver system 110.

In some embodiments, the filter driver controller 120 may establish a buffering schedule for transmitting write operations to the replication receiver system 110. For example, the filter driver controller 120 may establish a schedule which causes the filter driver to transmit however many write operations are in the buffer to the replication receiver system 110, every thirty seconds (or any other suitable period of time). The time frame of thirty seconds is only exemplary and the schedule may be dynamically adjusted, as will be described in greater detail below. According to some embodiments, the filter driver controller 120 may cause the filter driver 125 to both buffer and batch write operations before they are transmitted to the replication receiver system 110.

In accordance with the present disclosure, the filter driver controller 120 may adapt the buffering and/or batching of write operations. In general, while buffering and/or batching of write operations may reduce network congestion, buffering and/or batching of write operations may deleteriously affect the performance of the end user computing system 105. In some instances, when the buffer that is established on the end user computing system is too large, the computing system may temporarily run low on free memory causing latency on the end user computing system. Other system resources may also be negatively affected, such as CPU usage, when the buffering and/or batching operations occur during times when CPU usage is already high.

Thus, the filter driver controller 120 may evaluate computing resources such as free memory, CPU usage, and so forth, to determine an appropriate buffer size. Moreover, the filter driver controller 120 may continually or periodically evaluate computing resources of the end user computing system and adjust the size of the buffer in accordance with a workload threshold established for the computing system. The workload threshold may define a preferred level of computing resources that are to be maintained by the filter driver controller 120 when creating a buffer.

In some instances, to compensate for a reduction in buffer size, the filter driver controller 120 may intelligently adjust the schedule for transmitting write operations. Advantageously, as the buffer size decreases, the filter driver controller 120 may adjust the buffering schedule to increase the frequency with which write operations are transmitted to the replication receiver system 110. Again, the buffering schedule may be subject to network congestion thresholds that may prevent the filter driver controller 120 from transmitting the write operations too quickly.

The filter driver controller 120 may create a historical activity log that includes measurements of computing resources over time, as well as batching, buffering, and/or transmitting processes. The filter driver controller 120 may reference the log to determine an appropriate buffer size or schedule relative to current conditions for the end user computing system 105.

Write operations may be received by a replication module 130 that cooperates with the replication receiver system 110 to replicate file changes included in the write operations using the block parameters. In some instances, the block parameters may be used to update a mirror or snapshot that includes the relevant changed file. In other instances, the block parameters may be used to update an incremental file. According to some embodiments, the replication module 130 may create an incremental file from one or more received write operations. In yet other instances, the write operations may be stored in separate incremental files.

It will be understood that in some embodiments, the filter driver controller 120 may not be required. Thus, the filter driver 125, which is installed on the end user computing system, may perform the functions described above with regard to the filter driver controller 120.

While the above-described embodiments contemplate that the filter driver 125 determine block parameters from the write operations, one of ordinary skill in the art will appreciate that the filter driver controller 120 may determine the block parameters from write operations that are passed directly to the filter driver controller 120 by the filter driver 125. That is, the block parameters may be determined at the end user computing system 105 or at the replication receiver system 110.

According to some embodiments, rather than capturing and storing actual write data of the block parameters the filter driver 125 can record at least a portion of the block parameters for write operations. For example, the filter driver 125 may capture the offsets, lengths, and sizes of write operations. These parameters may be stored in the historical activity log. When actual data of the block parameters is needed, such as when the data of write operations is transmitted to the replication receiver system 110, the filter driver controller 120 may send a request to the OS of the end user computing system 105 to perform a file system snapshot of the end user computing system 105. The filter driver 125 may then read actual changed data from the file system snapshot and transmit the same to the replication receiver system 110.

Advantageously, large amounts of data need not be written to the buffer. Additionally, the filter driver 125 may still combine multiple write operations together allowing for changed data to be determined and transmitted to the replication receiver system 110 in an efficient manner.

Figure 2:
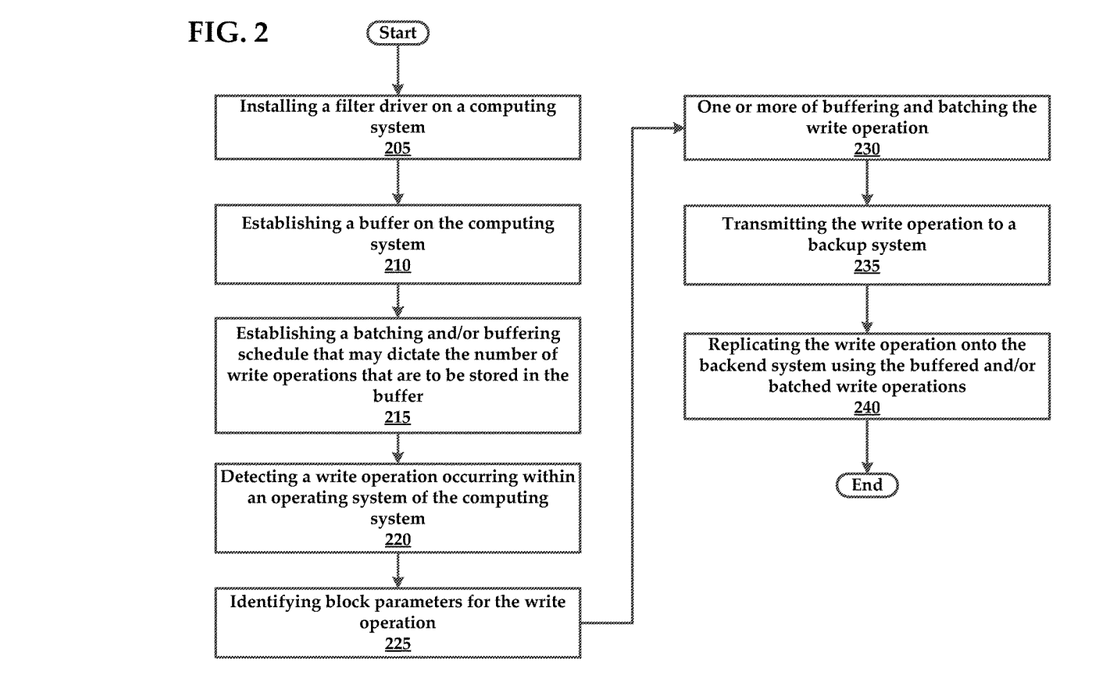
FIG. 2 is a flowchart of an exemplary method for detecting and transmitting file changes to a replication receiver system.

FIG. 2 is a flowchart of an exemplary method for detecting and transmitting file changes to a replication receiver system. According to some embodiments, the method may comprise a step 205 of installing a filter driver on a computing system. Again, the filter driver may be installed onto a layer of an operating system. Additionally, the method may comprise a step 210 of establishing a buffer on the computing system. As mentioned, the buffer may be created from free memory available on the computing system.

In an optional step, the method may comprise a step 215 of establishing a batching and/or buffering schedule that may dictate the number of write operations that are to be stored in the buffer, as well as a transmission interval that determines how often write operations (batched or single) are transmitted to the replication receiver system.

The method may also comprise a step 220 of detecting a write operation occurring within an operating system of the computing system. When a write operation has been detected, the method may comprise a step 225 of identifying block parameters for the write operation.

If necessary, the method may comprise a step 230 of one or more of buffering and batching the write operation, as well as a step 235 of transmitting the write operation to a replication receiver system. The method may additionally comprise a step 240 of replicating the write operation onto the backend system using the buffered and/or batched write operations. In some instances, the step 240 may utilize block parameters determined from the write operation such as offset, size, block data, etc.

Figure 3:
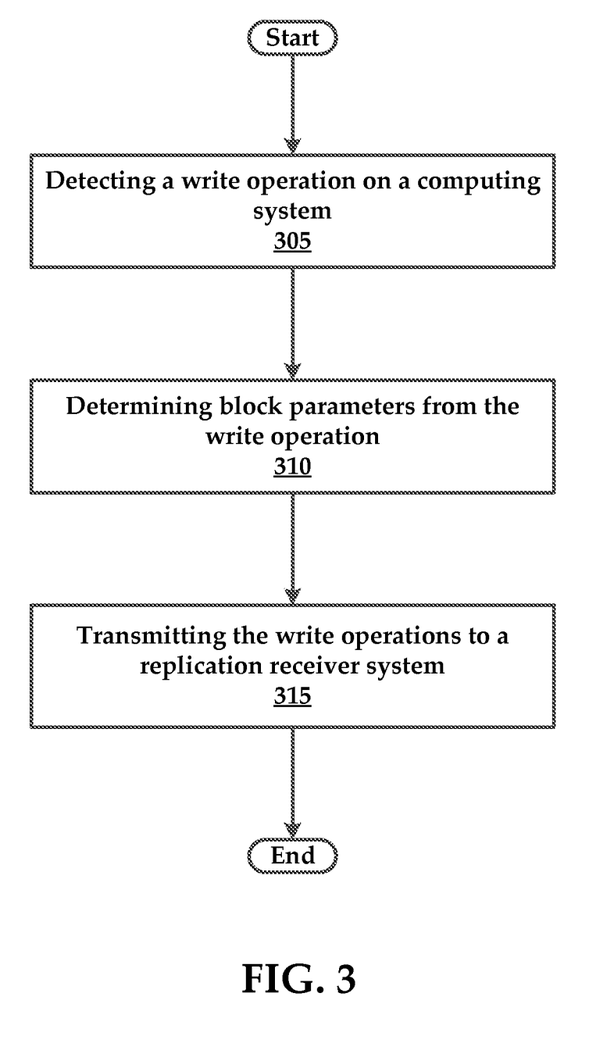
FIG. 3 is a flowchart of another exemplary method for detecting and transmitting file changes to a replication receiver system.

FIG. 3 illustrates another exemplary method for detecting and transmitting file changes to a replication receiver system. In this method, write operations may be substantially synchronously transmitted to the backend system without the need to buffer or batch the write operations. Therefore, the method may comprise a step 305 of detecting a write operation on a computing system. Again, as mentioned above, the write operation may comprise block parameters that define changes to a file. Additionally, the method may comprise a step 310 of determining block parameters from the write operation. Again, the block parameters may comprise an offset and a length that describe the location of the changed data in the file. The block parameters also comprise block data that represents the actual changed bytes in the file.

The method may also comprise a step 315 of transmitting the write operations (e.g., block parameters) to a replication receiver system. According to some embodiments, the operations of the filter driver may be controlled by a filter driver controller that executes on the replication receiver system. Although not shown, as with the method described in FIG. 2, the method of FIG. 3 may also comprise steps of installing a filter driver and/or replicating the write operation onto a backend system.

Figure 4:
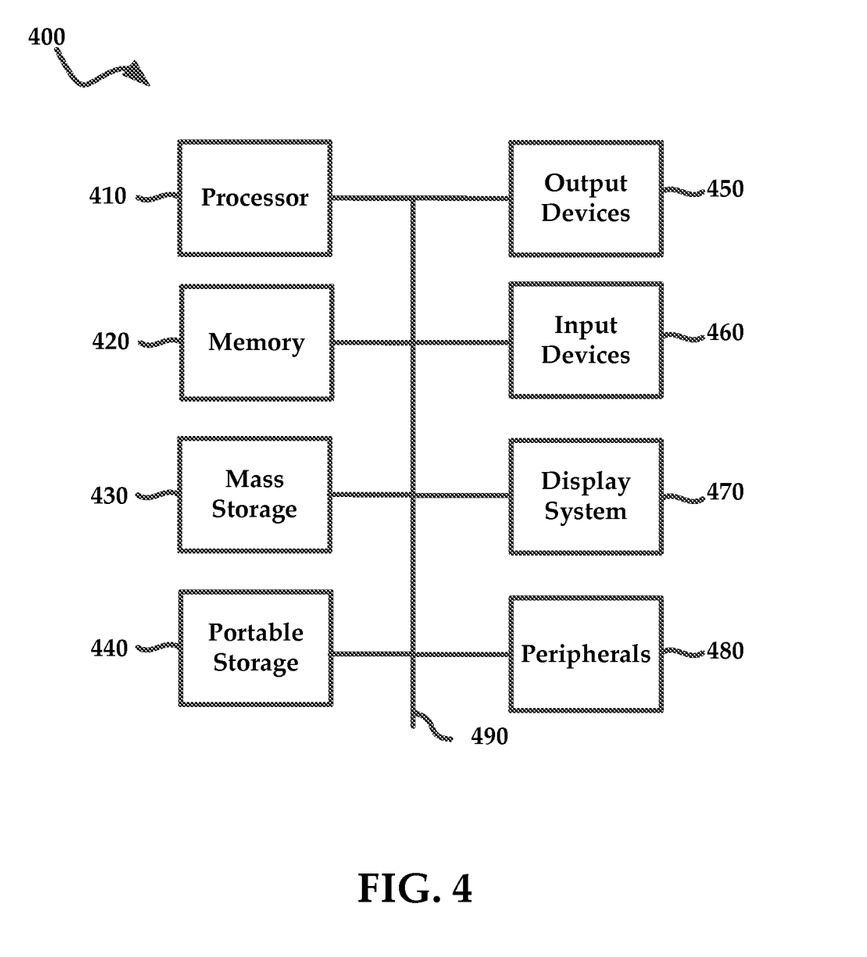
FIG. 4 illustrates an exemplary computing system that may be used to implement embodiments according to the present technology.

FIG. 4 illustrates an exemplary computing system 400 that may be used to implement an embodiment of the present technology. The computing system 400 of FIG. 4 includes one or more processors 410 and main memory 420. Main memory 420 stores, in part, instructions and data for execution by processor 410. Main memory 420 can store the executable code when the computing system 400 is in operation. The computing system 400 of FIG. 4 may further include a mass storage device 430, portable storage medium drive(s) 440, output devices 450, input devices 460, a graphics display 470, and other peripheral devices 480.

The components shown in FIG. 4 are depicted as being connected via a single bus 490. The components may be connected through one or more data transport means. Processor 410 and main memory 420 may be connected via a local microprocessor bus, and the mass storage device 430, peripheral device(s) 480, portable storage device 440, and graphics display 470 may be connected via one or more input/output (I/O) buses.

Mass storage device 430, which may be implemented with a magnetic disk drive, an optical disk drive, and/or a solid-state drive is a non-volatile storage device for storing data and instructions for use by processor 410. Mass storage device 430 can store the system software for implementing embodiments of the present technology for purposes of loading that software into main memory 420.

Portable storage device 440 operates in conjunction with a portable non-volatile storage medium, such as a floppy disk, compact disk or digital video disc, to input and output data and code to and from the computing system 400 of FIG. 4. The system software for implementing embodiments of the present technology may be stored on such a portable medium and input to the computing system 400 via the portable storage device 440.

Input devices 460 provide a portion of a user interface. Input devices 460 may include an alphanumeric keypad, such as a keyboard, for inputting alphanumeric and other information, or a pointing device, such as a mouse, a trackball, stylus, or cursor direction keys. Additionally, the computing system 400 as shown in FIG. 4 includes output devices 450. Suitable output devices include speakers, printers, network interfaces, and monitors.

Graphics display 470 may include a liquid crystal display (LCD) or other suitable display device. Graphics display 470 receives textual and graphical information, and processes the information for output to the display device.

Peripheral device(s) 480 may include any type of computer support device to add additional functionality to the computing system. Peripheral device(s) 480 may include a modem or a router.

The components contained in the computing system 400 of FIG. 4 are those typically found in computing systems that may be suitable for use with embodiments of the present technology and are intended to represent a broad category of such computer components that are well known in the art. Thus, the computing system 400 of FIG. 4 can be a personal computer, hand held computing system, telephone, mobile computing system, workstation, server, minicomputer, mainframe computer, or any other computing system. The computer can also include different bus configurations, networked platforms, multi-processor platforms, etc. Various operating systems can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

It is noteworthy that various modules and engines may be located in different places in various embodiments. Modules and engines mentioned herein can be stored as software, firmware, hardware, as a combination, or in various other ways. It is contemplated that various modules and engines can be removed or included in other suitable locations besides those locations specifically disclosed herein. In various embodiments, additional modules and engines can be included in the exemplary embodiments described herein.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method, comprising:
   detecting a write operation on an end user computing system by an agent placed on the end user computing system, the write operation comprising block parameters that define changes to a file, wherein the block parameters are part of a changed set that corresponds to the write operation without actual changed bytes of data of the write operations;
   establishing, by the agent, a buffer from free memory available on the end user computing system;
   storing, by the agent, the block parameters in the buffer prior to transmitting the block parameters of the write operation to a replication receiver system;
   transmitting the block parameters to the replication receiver system from the buffer;
   obtaining the actual changed bytes of data using the block parameters; and
   transmitting the actual changed bytes of data to the replication receiver system, wherein the replication receiver system creates or updates an incremental file or snapshot using the block parameters and the actual changed bytes of data, so as to allow for near-continuous replication of changes to the file.

2. The method according to claim 1, further comprising replicating changes to a corresponding file on the replication receiver system using the block parameters and the actual changed bytes of data.

3. The method according to claim 1, wherein the block parameters comprise an offset, a block size, and block data.

4. The method according to claim 1, wherein block parameters for write operations are transmitted from the buffer to at least the replication receiver system according to a schedule.

5. The method according to claim 1, wherein the buffer comprises an amount of memory of the end user computing system and wherein block parameters for write operations are transmitted from the buffer to the replication receiver system when the buffer is substantially full of block parameters for write operations.

6. The method according to claim 5, further wherein block parameters for write operations are transmitted from the buffer to the replication receiver system according to a schedule.

7. The method according to claim 5, wherein the amount of memory is dynamically modified based upon an amount of free memory available for the end user computing system.

8. The method according to claim 7, wherein dynamic modification of the amount of memory modifies a schedule used to determine when block parameters for write operations are transmitted from the buffer to the replication receiver system.

9. The method according to claim 5, wherein the amount of memory is dynamically modified in accordance with workload threshold established for the end user computing system.

10. The method according to claim 1, further comprising coalescing the block parameters of plurality of write operations together prior to transmitting to the replication receiver system.

11. The method according to claim 10, further comprising collecting a plurality of write operations together into a changed set without capturing the actual changed bytes of data.

12. The method according to claim 11, further comprising obtaining changed data blocks for a changed set from a file system snapshot; and transmitting the changed data blocks to the replication receiver system.

13. The method according to claim 11, further comprising obtaining changed data blocks for combined changed sets from a file system snapshot; and transmitting the changed data blocks to the replication receiver system.

14. The method according to claim 1, further comprising:
   obtaining multiple file system snapshots and changed sets for the end user computing system;
   providing the multiple file system snapshots and changed sets to multiple replication receiver systems using multiple replication streams.

15. A method, comprising:
   detecting a write operation occurring within an operating system of an end user computing system by an agent placed on the end user computing system;
   identifying, by the agent, block parameters for the write operation;
   capturing, by the agent, an offset, a length, and size of the write operation, rather than capturing the actual write data of the write operation;
   one or more of buffering and batching the block parameters, by the agent, the block parameters being stored in free memory of the end user computing system;
   transmitting only the block parameters to a replication receiver system;
   obtain a snapshot of the end user computing system;
   obtain the actual changed bytes of data from the snapshot using the offset, length, and size; and
   transmit the actual changed bytes of data to the replication receiver system, so as to allow for near-continuous replication of changes to files.

16. The method according to claim 15, wherein transmitting the write operation occurs according to a schedule.

17. The method according to claim 15, wherein batching comprises storing a predetermined amount of write operations in a buffer, the predetermined amount of write operations being based upon a size of the buffer.

18. A system, the system comprising:
   at least one server having a memory that includes executable instructions and a processor executing the instructions, the instructions comprising:
      a filter driver controller communicatively couplable with a filter driver installed in a layer of an operating system of an end user computing system, the filter driver controller executing the filter driver to:
         detect a write operation on the end user computing system, the write operation comprising block parameters that define changes to a file, wherein the block parameters are part of a changed set that corresponds to the write operation without actual changed bytes of data of the write operations;
         transmit the block parameters to a replication receiver system;
         obtaining the actual changed bytes of data using the block parameters;
         transmit the actual changed bytes to a replication module, the replication module using the block parameters and the actual changed bytes to create or update an incremental file or update a snapshot, so as to allow for near-continuous replication of changes to the file.

19. The system according to claim 18, wherein the filter driver controller further executes the filter driver to determine block parameters from the write operation, the block parameters comprising an offset, a block size, and block data.

20. The system according to claim 18, wherein the filter driver controller further:
   establishes a buffer on the end user computing system through controlling the filter driver; and
   executes the filter driver to store block parameters in the buffer through controlling the filter driver.

21. The system according to claim 20, wherein the filter driver controller further executes the filter driver to transmit block parameters from the buffer to the replication receiver system according to a schedule.

22. The system according to claim 20, wherein the filter driver controller causes the filter driver to transmit block parameters from the buffer to the replication receiver system when the buffer is substantially full of block parameters, wherein the buffer comprises a predetermined amount of memory of the end user computing system.

23. The system according to claim 22, wherein the amount of memory is dynamically modifiable by the filter driver controller based upon an amount of free memory available for the end user computing system.

24. The system according to claim 18, further comprising a replicator module that:
   receives the block parameters; and
   replicates the write operation onto the replication receiver system using the block parameters.

25. A system, the system comprising:
   a filter driver installed on an end user computing device; and
   at least one server having a memory that includes executable instructions and a processor executing the instructions, the instructions comprising:
      a filter driver controller, the filter driver controller executing the filter driver to:
         detect a write operation on the end user computing system, the write operation comprising block parameters that define changes to a file, wherein the block parameters are part of a changed set that corresponds to the write operation without actual changed bytes of data of the write operations;
         store the block parameters in an activity log;
         obtain a snapshot of the end user computing system;
         retrieving the block parameters from the activity log;
         obtain the actual changed bytes of data from the snapshot using the block parameters; and
         transmit the actual changed bytes of data to a replication receiver system, so as to allow for near-continuous replication of changes to the file.

* * * * *